May 14, 1968 M. A. CASH 3,382,825
QUILTING APPARATUS HOLDER INTERCHANGING MEANS
Filed Oct. 20, 1965 5 Sheets-Sheet 1
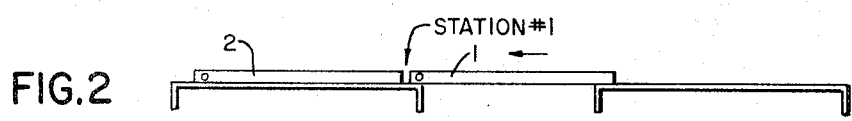
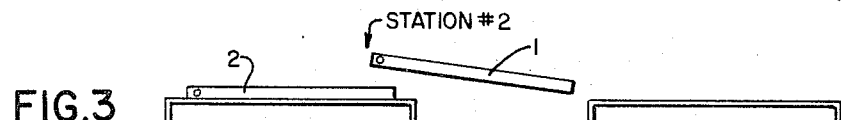
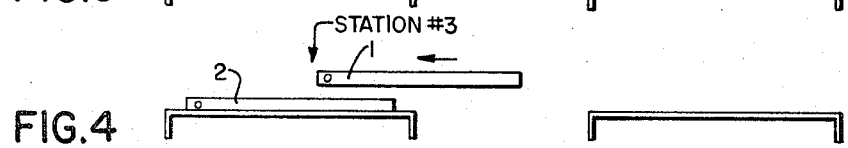
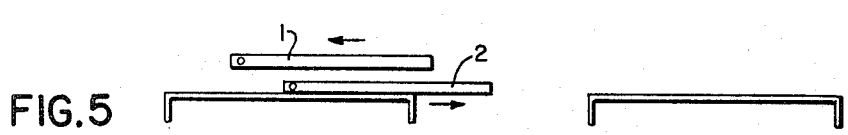
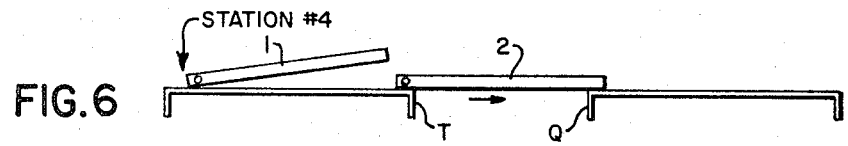
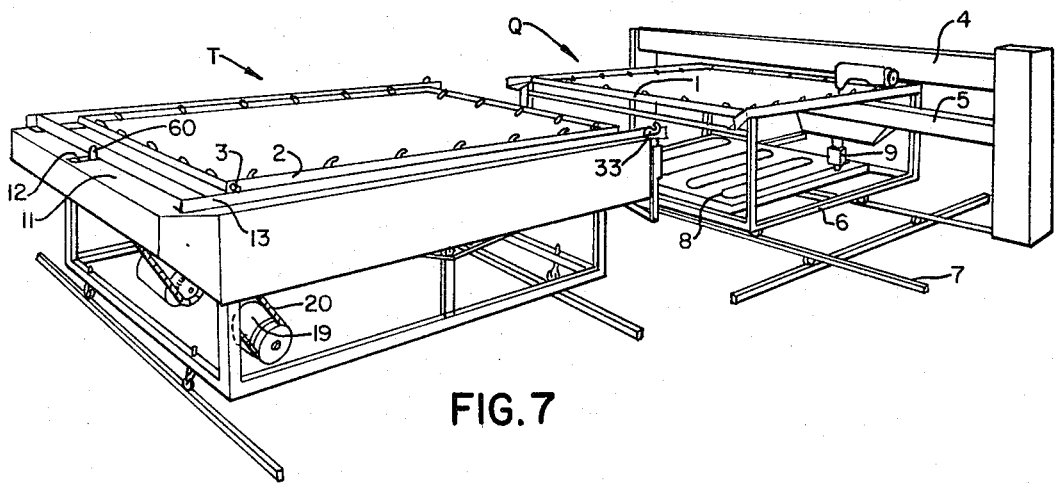
INVENTOR.
MARION A. CASH
BY Arthur H. Robert
ATTORNEY May 14, 1968 M. A. CASH 3,382,825
QUILTING APPARATUS HOLDER INTERCHANGING MEANS
Filed Oct. 20, 1965 5 Sheets-Sheet 3

*INVENTOR.*
MARION A. CASH
BY Arthur H. Roberts
ATTORNEY

INVENTOR.
MARION A. CASH
BY Arthur H Robert
ATTORNEY

May 14, 1968  M. A. CASH  3,382,825
QUILTING APPARATUS HOLDER INTERCHANGING MEANS
Filed Oct. 20, 1965  5 Sheets-Sheet 5

INVENTOR.
MARION A. CASH
BY Arthur H. Robert
ATTORNEY

United States Patent Office 3,382,825
Patented May 14, 1968

3,382,825
QUILTING APPARATUS HOLDER
INTERCHANGING MEANS
Marion A. Cash, Louisville, Ky., assignor to James Cash Machine, Louisville, Ky., a corporation of Kentucky
Filed Oct. 20, 1965, Ser. No. 498,907
11 Claims. (Cl. 112—117)

ABSTRACT OF THE DISCLOSURE

An improved transfer means for interchanging a 1st quilt-holder on a quilting machine with a 2nd quilt-holder on a loading table wherein a 1st holder moving means is operative, when actuated, to move the 1st quilt holder in leapfrog fashion from a ready position on the quilting machine rearwardly upward to and along an elevated clearance level over the 2nd quilt holder and thence rearwardly downward into an operative loading positon on the loading table while a 2nd holder moving means is operative, when actuated, to move the 2nd quilt holder from its operative position horizontally forward toward the quilting machine. A control means effects the actuation of the 1st and 2nd moving means in a predetermined time-phase relationship.

---

Figure 8:
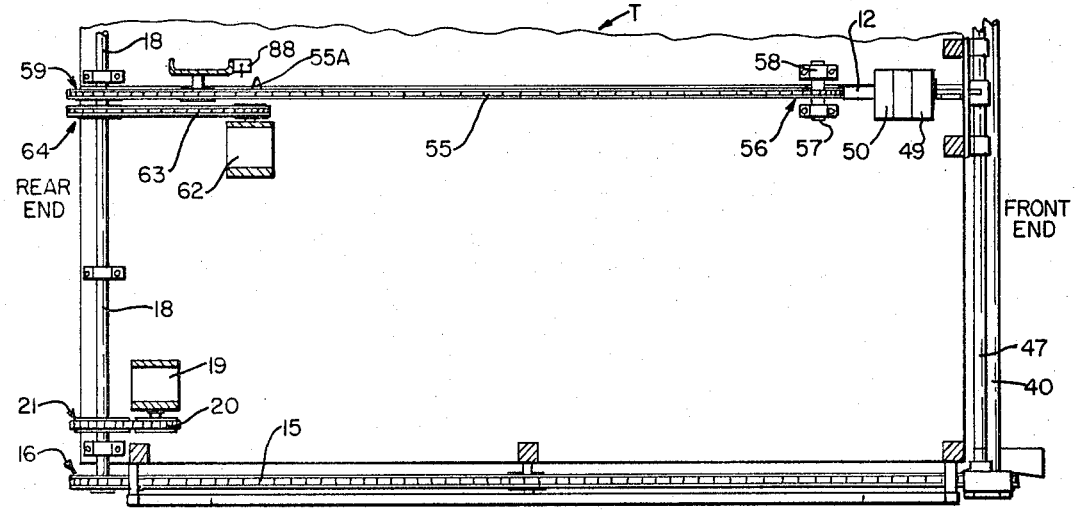

One type of quilting apparatus presently employed conventionally comprises: (1) a quilt-holder composed of (a) a perimetrical work-holding frame having a rectangular opening across which an unsewn rectangular quilt-forming assembly or workpiece may be stretched and (b) means for clamping the periphery of the stretched workpiece to the perimetrical frame; (2) a loading table for supporting a quilt-holder while an unsewn workpiece is loaded thereon or a sewn workpiece is unloaded therefrom; and (3) a quilting machine composed of (a) a sewing machine having a needle-operating mechanism and a stitch-locking mechanism, (b) a stationary frame having a base frame supporting the stitch-locking mechanism and a head frame supporting the needle-operating mechanism, (c) carriage means mounted on the base frame to support the quilt-holder for back and forth movement both longitudinally and transversely, (d) a suitably mounted endless guide track shaped to establish the pattern of carriage movement which is to be followed in sewing the workpiece with a given design of stitching, and (e) drive means for operating the sewing machine while moving the carriage means in accordance with the sewing design guide, said means including a rotary track-follower which is universally mounted at a fixed location where it engages the guide track and which is rotated by the drive means to drive the track and thereby move the carriages and quilt in accordance with the pattern of the guide track.

In conventional operation, an empty quilt-holder is placed on the loading table so that an unsewn workpiece may be stretched thereacross and its periphery clamped thereto and then the loaded holder is placed on the quilting machine which is thereafter operated to sew the workpiece. At the end of the sewing operation, the thread is cut, the quilt-holder is returned to the loading table where it is unloaded, reloaded and again placed on the quilting machine for another sewing operation.

To reduce the time lapse between the end of one sewing operation and the beginning of the next, it has been proposed (a) to provide 1st and 2nd quilt-holders so that at least part of each unloading-reloading operation may be performed contemporaneously with a sewing operation and (b) to provide the loading table with a holder transfer means (or holder interchange means) for automatically removing the 1st quilt-holder from the quilting machine to an intermediate or preliminary position on the loading table and for contemporaneously moving the 2nd quilt-holder from its operative position on the loading table to the quilting machine. Thereafter the 1st quilt-holder is (manually) moved on the loading table from its preliminary position to its operative position in which it is unloaded and then reloaded. This arrangement saves time to the extent that the unloading-reloading operation overlaps the sewing operation. Nevertheless, it normally involves a substantial time loss in moving a quilt-holder from its intermediate position on the loading table to its operative position thereon.

The present invention relates to the holder transfer means and has, for its principal object, the provision of a more completely automatic holder transfer means providing a substantial decrease in the time required to remove a quilt-holder from the quilting machine to its operative position on the loading table with a corresponding increase in capacity or output.

Another important object of the present invention is to provide an improved holder transfer means which decreases the time normally lost between the end of one sewing operation and the beginning of the immediately following quilt-holder unloading-reloading operation and which enables the interchange operation to be effected smoothly and rapidly.

Other important objects of my invention are: to simplify the design of the holder transfer means and improve its construction and operation in a manner such as to render its operation smoother and more reliable; and to reduce its maintenance.

In a quilting apparatus made in accordance with my invention, the operative positions, of the 1st quilt-holder on the quilting machine and of the 2nd quilt-holder on the loading table, may be and preferably are on the same horizontal working level. When the interchange is to be effected, the 1st holder is first moved rearwardly along the horizontal working level from its operative sewing position on the quilting machine to a "ready" position wherein its rear end extends not only closely adjacent the front end of the 2nd quilt-holder but also within reach of the transfer means.

The more important objectives of this invention are attained, in accordance with my invention, by providing the loading table with a transfer means which comprises: (A) means for moving the 1st quilt-holder in leapfrog fashion from its ready position rearwardly upward to and rearwardly along an elevated clearance level over the front end of the second quilt-holder, thence rearwardly downward into its operative position on the loading table; (B) means for moving the 2nd quilt-holder from its operative position horizontally forward toward and preferably to its operative position on the quilting machine; and (C) control means for actuating the 1st holder and 2nd holder moving means in a manner such as to start the rearward upward movement of the 1st holder first, then start the movement of the 2nd holder forwardly along the work level after its front end is cleared for such movement by the raising of the 1st quilt-holder and finally complete the forward movement of the 2nd holder out of its operative position before the 1st quilt-holder is lowered into such position.

More particularly, the presently preferred form of the 1st holder moving means of my table-mounted transfer means, element (A) above, comprises: (1) a 1st holder conveyor operative, when actuated, to move the front end of its upper run rearwardly the full length of the loading table; (2) a 1st holder guide means providing a leapfrog path in a form having rearwardly-extending inclining and declining sections respectively adjacent the interchange and rear ends of the loading table and an elevated clearance section therebetween; (3) coupler means carried by the 1st holder conveyor in position to engage the rear end of a 1st quilt-holder in the ready position and move that end rearwardly along the leapfrog path prescribed by the guide means; and (4) jack means for raising the trailing portion of said rearwardly moving 1st quilt-holder to the elevated level of said clearance section, for slidably maintaining the front end at that level until the rearward movement of the 1st holder and the downward movement of its rear end is substantially completed and for then lowering its front end.

My improved transfer means enables the 1st and 2nd quilt-holders to be rapidly interchanged by leapfrogging the 1st holder rearwardly from its ready position directly to its operative unloading position so that the unloading operation may be instituted without any appreciable loss of time while contemporaneously moving the 2nd holder horizontally from its operative position on the loading table forwardly toward its operative position on the quilting machine so that the next sewing operation may be promptly instituted. By automatically moving the 1st quilt-holder directly and rapidly into its operative position on the loading table, I am able to minimize the time lapse between the end of a given sewing operation and the beginning of the next following unloading-reloading operation. As a result, I have succeeded in increasing the productive sewing capacity of a given quilting machine from about 22 sewing operations per hour to about 50 sewing operations per hour.

Figure 9:
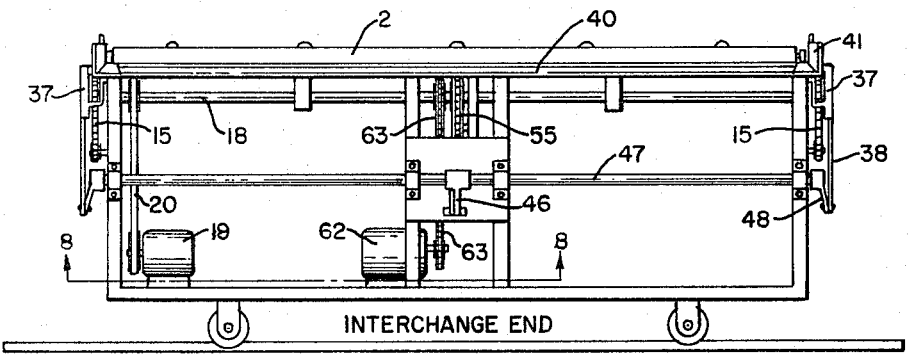
Figure 10:
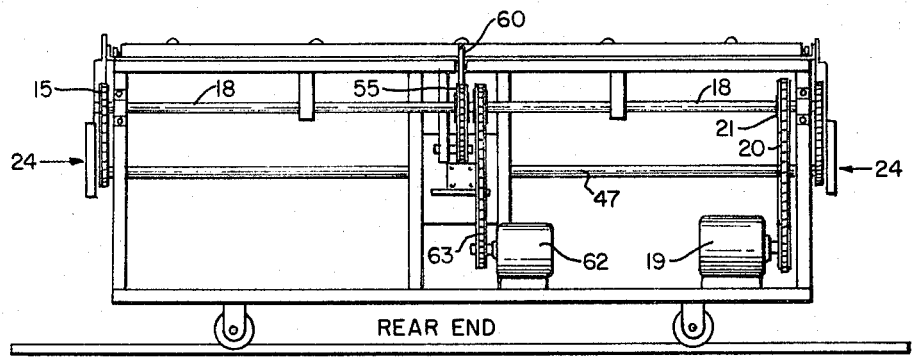
Figure 11:
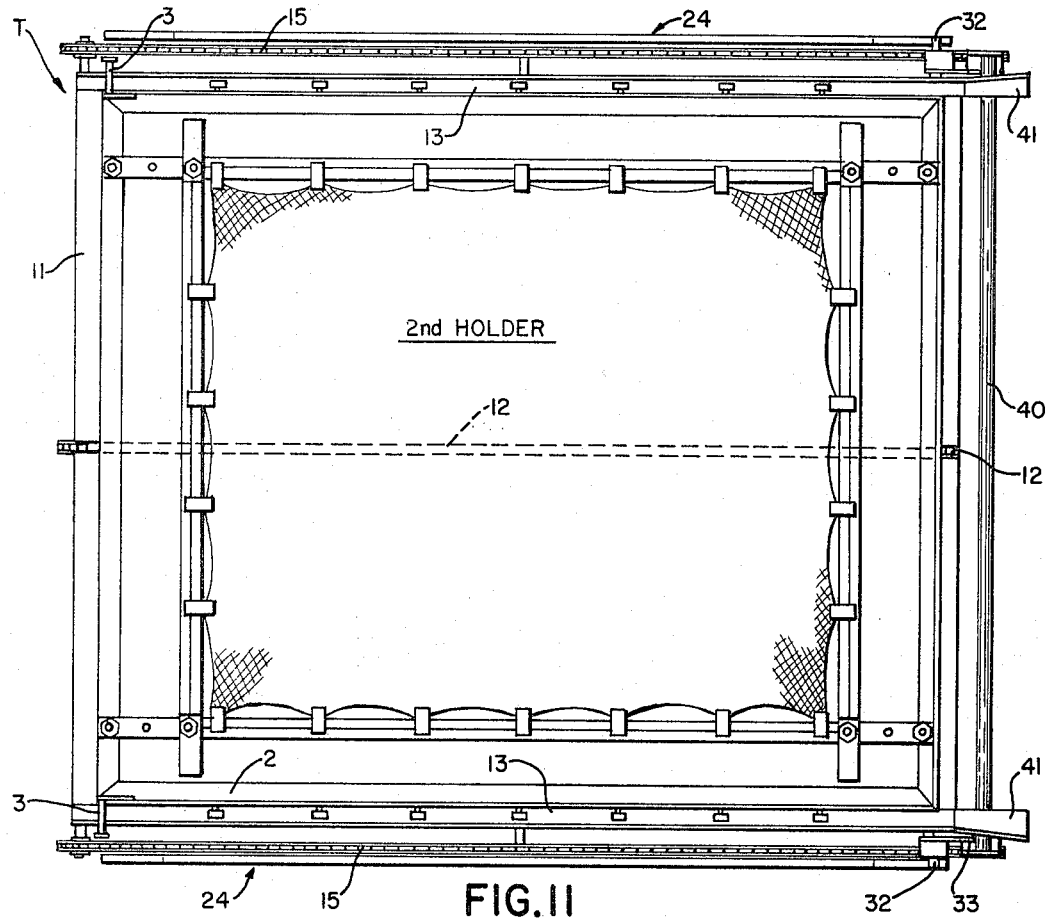
Figure 12:
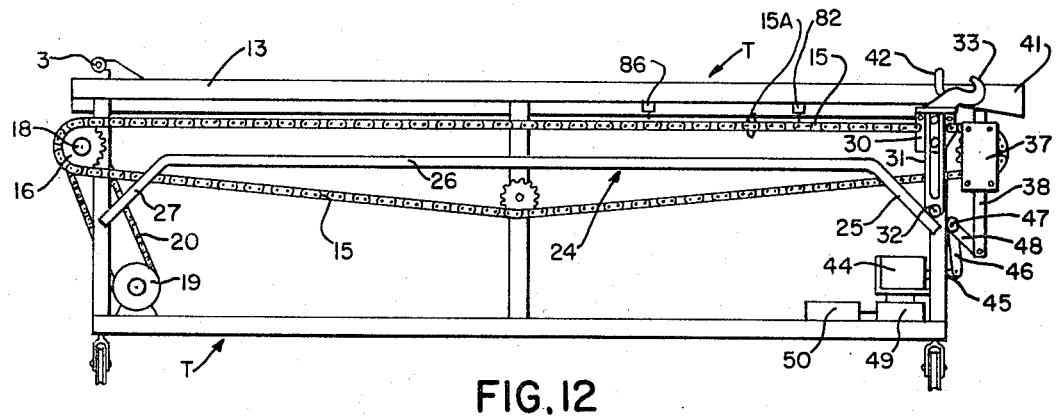
Figure 13:
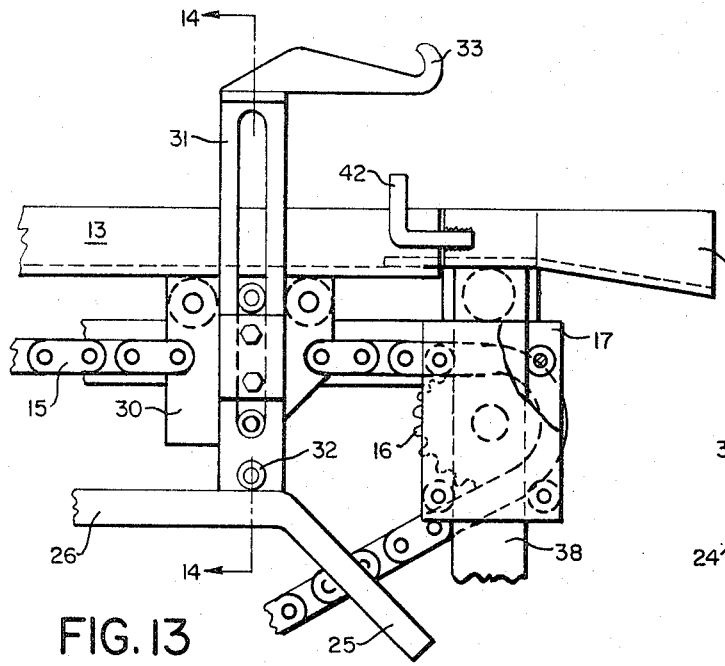
Figure 14:
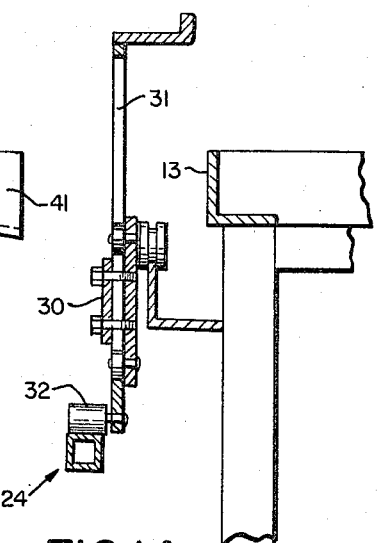
Figure 15:
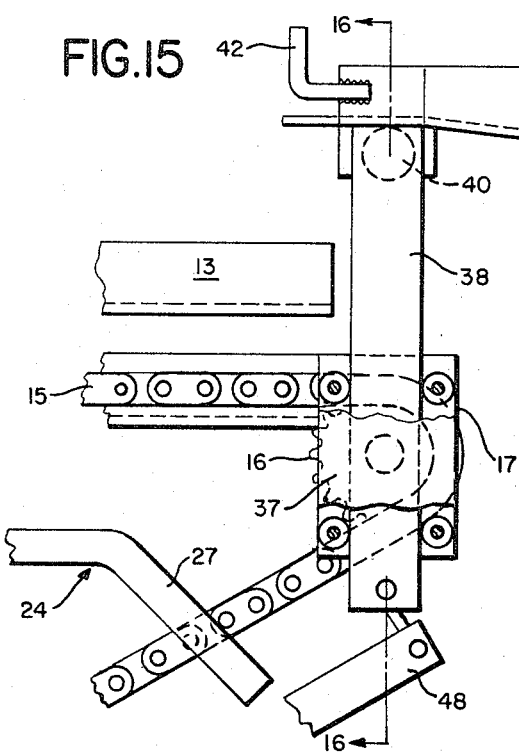
Figure 16:
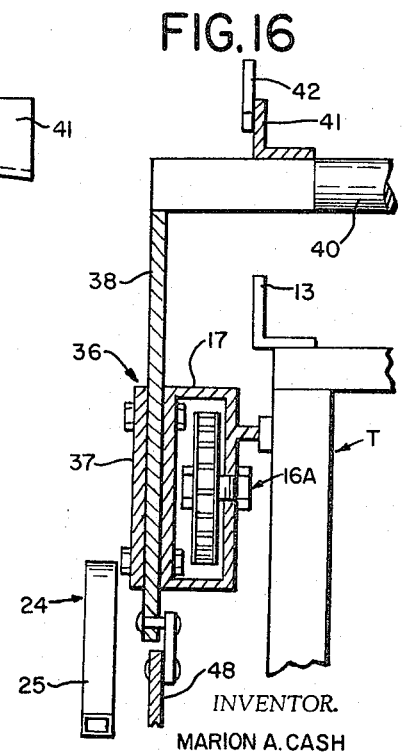
Figure 17:
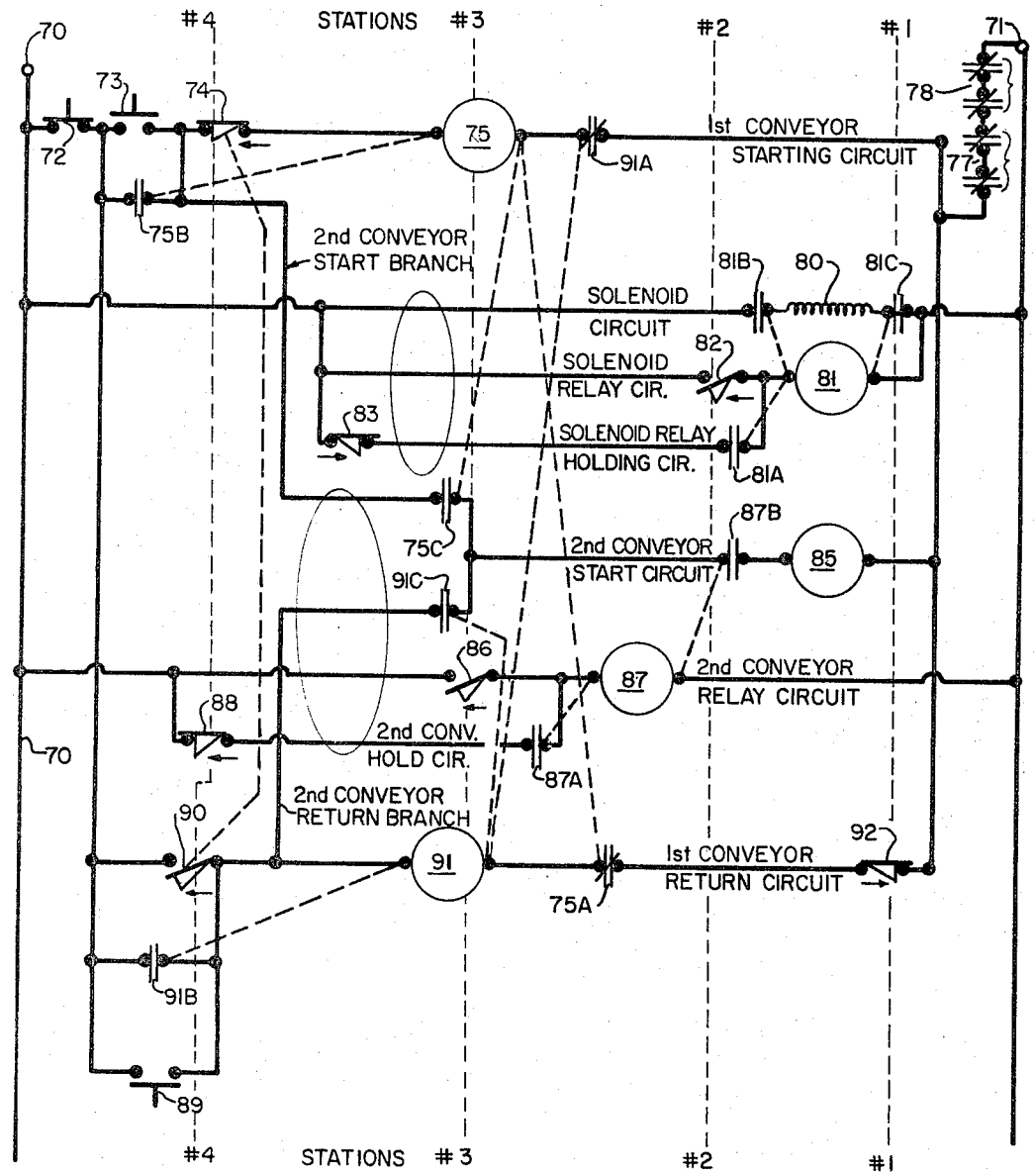

My invention is illustrated in the accompanying drawings wherein:

FIGS. 1–6 are schematic views provided to facilitate an understanding of the interchange or holder transfer operation of my apparatus, FIG. 1, showing the relative positions of a pair of the holders at the beginning of an exchange operation, wherein one holder is operatively positioned on the quilting machine and the other holder is operatively positioned on the loading table, these positions being reversed at the end of the interchange operation, and FIGS. 2–6 showing the relative positions of the said holders at successive intervals after the beginning and before the end of the interchange operation;

FIGS. 7–16 illustrate the presently preferred embodiment of a quilting apparatus constructed in accordance with my invention, FIGS. 7–12 being perspective, plan and elevational views showing the aparatus as it appears when both holders are in their respective operative positions ready for the interchange operation but before that operation has started, FIG. 7 being a perspective and somewhat schematic view of the quilting apparatus, FIG. 8 being a bottom plan view of approximately one-half of the loading table, FIGS. 9 and 10 being elevational views of the interchange end and the rear end, respectively, of the loading table, and FIGS. 11 and 12, respectively, being top plan and side elevational views of the loading table with its aprons removed and with its interchange end at the right, and FIGS. 13–16 being fragmentary views in which FIG. 13 is a fragmentary view showing the movable coupler in its raised position wherein it holds the rear end of the first quilt-holder at the clearance level, FIG. 14 is a fragmentary section taken along line 14—14 of FIG. 13, FIG. 15 is a fragmentary view showing the jack means in its raised position wherein it holds the front end of the 1st quilt-holder at the clearance level, and FIG. 16 is a fragmentary view taken along line 16—16 of FIG. 15; and FIG. 17 is a circuit diagram of the control means.

FIGS. 1–6

It has been previously noted that FIGS. 1–6 are schematic views, provided to facilitate an understanding of the transfer or exchange operation effected by my apparatus. FIG. 1 shows 1st and 2nd holders 1 and 2 located in their respective operative positions at the same working level, the 1st holder being on a quilting machine Q and the 2nd holder on a loading table T, which may be viewed as having four spaced stations comprising station #1 at its front end, intermediate stations #2 and #3 spaced along its front half and station #4 at its rear end.

*Station #1.*—In FIG. 2, the 1st holder 1 has been moved from its operative quilting position rearwardly along the working level to a "ready" position in which its rear end is adjacent both the front end of the 2nd holder 2 and station #1.

*Station #2.*—In FIG. 3, the rear end of the first holder is adjacent station #2 which it reaches after it has been raised to its clearance level and simultaneously moved slightly rearward.

*Station #3.*—In FIG. 4, the rear end of holder 1 is adjacent station #3 which it reaches when the forward movement of holder 2 is started.

FIG. 5 shows holders 1 and 2 after the rear end of holder 1 has been moved rearwardly from station #2 and holder 2 has completed an initial part of its forward movement.

*Station #4.*—FIG. 6 shows the relative positions of the holders after the rear end of holder 1 has been lowered to the working level which it reaches adjacent station #4 while its front end remains at the clearance level and after holder 2 has moved forwardly enough to clear the loading table for holder 1. The transfer is completed when the rear end of the 1st holder is lowered to the working level and the FIG. 1 positions of the holders are reversed. Now, the quilting operation may be instituted on the quilting machine Q while the holder 2 on table T may be relieved of the sewn quilted assembly and reloaded with an unsewn assembly.

FIGS. 7–17

The quilting apparatus illustrated in FIGS. 7–17 comprises: (1) a pair of holders 1 and 2; (2) a quilting machine; (3) a work loading or makeup table; and (4) table-mounted transfer means.

WORK HOLDERS

In carrying out my invention, any conventional form of work holders 1 and 2 may be employed such as those disclosed in U.S. Cash Patents 3,127,858 and 3,180,293. Generally speaking such holders or perimetric frames comprise a rigid rectangular sash-like frame having a central opening which is to be closed by an unsewn quilt assembly and through which that assembly is exposed for sewing or quilting purposes; clamping means for securing the perimeter of the quilt assembly to the frame; roller means along each side of the holder for roller supporting it on the quilting machine or table as the case may be; and a pair of trunnions 3, one projecting horizontally from the rear end portion of each side thereof.

QUILTING MACHINE

Any suitable form of conventional quilting machine Q may be used in carrying out the present invention. Accordingly quilting machines of the character shown in Cash Patents 3,127,858 and 3,180,293 may be employed.

It should suffice to say that the quilting machine employed comprises: (1) stationary head and base frames 4 and 5 cooperatively supporting the stitching and stitch-locking mechanisms of one or more sewing machines; (2) an upper carriage 6 supporting a work holder in said 1st operative position for "east-west" movement; (3) a lower carriage 7 supporting the upper carriage for "north-south" movement; (4) a track 8 establishing the pattern of carriage movement which is to be followed in sewing the layers of the work piece together with a desired design of stitching; and (5) suitable drive means for operating the stitching and stitch-locking mechanisms of the sewing machine and for moving the carriage means, the latter means including a track-engaging follower 9.

LOADING TABLE

The loading table T, as distinguished from the holder transfer means mounted on it, may be of any suitable form. The table shown, which supports a work holder in said 2nd operative position, comprises: a table top 11 preferably slotted at 12 along its longitudinal center from about its front end to about its rear end and having a pair of forwardly extending guide tracks 13, one along each of its side margins; and a suitable supporting framework conventionally composed of 6 table legs, one at (and one between) each front and rear corner, and longitudinal and cross braces.

TABLE MOUNTED TRANSFER MEANS

The table-mounted transfer means, for leapfrogging the 1st holder rearwardly toward the 2nd operative position while contemporaneously moving the 2nd holder forwardly out of said 2nd operative position, is composed of 3 elements, say A, B and C, comprising: (A) first holder moving means operative, when actuated, to move a 1st quilt-holder rearwardly along a leapfrog path extending from said ready position rearwardly upward to and along a clearance level above the front end of said 2nd operative position and then rearwardly downward into said 2nd operative position; (B) second holder moving means operative, when actuated, to move the 2nd quilt-holder forwardly out of said 2nd operative position; and (C) transfer control means operative, when activated, to actuate said 1st holder moving means initially and then to actuate said 2nd holder moving means after the leapfrog movement of the 1st holder has initially proceeded sufficiently to clear the front end of the 2nd holder for forward movement and before the 1st quilt-holder is lowered into said 2nd operative position.

First holder moving means

The first holder moving means, which is operative, when actuated, to leapfrog a 1st quilt-holder from said ready position rearwardly to said 2nd operative position, includes: (1) a first holder conveyor movable back and forth between the interchange and rear ends of the loading table frame; (2) guide means providing a leapfrog path having rearwardly-extending inclining and declining sections respectively adjacent the interchange and rear ends of the loading table and an elevated clearance section therebetween; (3) coupler means including a movable coupler normally positioned at the interchange end of the table and connected to both the first holder conveyor and the guide means for rearward movement with the conveyor and contemporaneous vertical movement relative to the conveyor, (a) said movable coupler being operative, during said contemporaneous movement, to engage the rear end of a 1st quilt-holder in said ready position and move it rearwardly with the first holder conveyor and vertically relative to the conveyor in accordance with the rearwardly inclining, elevated and rearwardly declining sections of the guide means; and (4) jack means mounted at the interchange end of the loading table, in position to engage the 1st holder slidably, and operative, when actuated after the rear end of the 1st holder has been moved rearwardly upward to a clearance level, to raise the trailing portion of the 1st holder to an upper clearance level.

*First holder conveyor.*—The first holder conveyor comprises: two identical conveyor assemblies, one located at each side of the loading table T from one end to the other thereof; and a common drive means.

Each 1st conveyor assembly comprises: an endless conveyor chain 15; front and rear sprockets 16 rotationally supporting the front and rear ends of the endless chain 15; and open-ended front box frame 17 located along the outer side face of a front loading table leg near the upper end thereof and rigidly mounted thereon, as seen in FIGS. 15–16, said box frame 17 rotationally carrying the stub shaft 16A for front sprocket 16 and mounting it on the loading table; and a cross drive shaft 18 rotationally supporting the rear sprocket 16 on the loading table.

The rear cross drive shaft 18 is extended under and across the width of the loading table T near its top to support the rear sprockets 16 of both first conveyor assemblies. The common drive means for these assemblies includes: a motor 19 mounted on a bottom of the loading table; a motor-driven chain 20; and a chain-driven drive sprocket 21 fixedly secured to cross drive shaft 18, as best seen in FIG. 10.

*First holder guide means.*—The guide means provides a leapfrog path having short front and rear sloping sections interconnected by a long elevated center section. The guide means is in the form of a pair of duplicate longitudinally-extending tracks 24, one positioned along each side of the loading table T, to extend from one end thereof to the other. Proceeding from front to rear, each track 24 has a sloping (rearwardly inclined) front section 25, an elongate center section or clearance section 26 at an elevated clearance level and a sloping (rearwardly declined) rear section 27. Each track is rigidly mounted upon the frame of the loading table T in any suitable manner.

*First holder coupler means.*—The coupler means is provided in duplicate, one at each side of the loading table for the corresponding first conveyor assembly. The coupler means functions to engage the rear end of the 1st holder in its ready position and to move that rear end rearwardly to the full length of the loading table in a leapfrog manner controlled by the contour of the leapfrog path established by tracks 24.

Each coupler means comprises: a box frame 30 open at its top and bottom ends to provide a vertical passageway therethrough; means mounting that box frame 30 on the conveyor chain 15, preferably as an element of the chain, which is so located on the upper run of the chain as to move rearwardly and forwardly therewith between the rear side of the front sprocket 16 and the front side of the rear sprocket 16; a vertically arranged slide bar 31 mounted in said vertically-open box frame 30 for vertical movement between bottom and top limits at the working and clearance levels; a roller 32 mounted on the lower end portion of the slide bar 31 in position to engage the track 24 and, through such engagement, move the slide bar 31 vertically in accordance with the contour of the leapfrog track during the rearward and forward movement of the 1st conveyor chain 15; and a hook 33 carried by the upper end of the slide bar 31 in position to engage a trunnion or stud 3 on the rear end portion of a first holder in the ready position and move it rearwardly and vertically in accordance with the rearward and vertical movements of the slide bar 31.

*First holder jack means.*—The jack means for raising the trailing portion of a 1st quilt holder to an elevated clearance level comprises: two identical jack assemblies, one at each side of the loading table T; means for supporting a 1st holder on the jack assemblies; and a common jack moving means.

Each jack assembly comprises: a vertically-open box frame 36 cooperatively formed by the horizontally-open box frame 17 of the corresponding 1st holder conveyor assembly and a plate 37 mounted on the box frame 17 to extend vertically along the outer side face thereof in outwardly-spaced relationship thereto, this vertically-open box frame 36 having between plate 37 and box frame 17 a vertically-open passageway; and a vertically-arranged jack member 38 extending through the vertical passageway of vertically-open box frame 36 for vertical movement between bottom and top limits corresponding to working and clearance levels.

The means for supporting a 1st holder on the duplicate jack assemblies at opposite sides of the loading table comprises: a top cross bar 40 extending from the upper end of one jack member 38 to the other and secured to both; a pair of laterally-spaced holder supporting short track sections 41 mounted on the top cross bar 40 in position to provide front end extensions of the holder supporting tracks 13 on the loading table and to function as supports for the rear end of a 1st holder in its ready position at the beginning of an interchange operation; and an abutment 42 mounted on the rear end of extension track 41 in position to stop the rearward movement of the 1st holder from the quilting machine to the loading table at the desired ready position and thereby position its trunnions 3 for lifting engagement by holder-engaging hooks 33 of the coupler bar 31.

The common means provided to operate both jack means in unison, comprises: a solenoid operated air cylinder 44 mounted underneath the front end of the loading table with the projecting end of its piston rod 45 connected through a link 46 to turn a crank shaft 47, the opposite ends of which carry crank arms 48, the outer ends of each crank arm 48 being pivotally connected to the lower end of the corresponding jack member 38; an air valve 49 for energizing air cylinder 44 in one direction and either energizing or deenergizing it in the opposite direction; and a solenoid 50 operative when energized, to operate the valve 49 in the direction required to cause the air cylinder 44 to raise the jack means, the arrangement being such that when the solenoid 50 is deenergized the valve 49 will return to its initial position and thereby permit or force the jack means to descend to its lower working-level position. In other words, when the air cylinder 44 is energized one way, it turns the crank shaft 47 to raise both jack members 38. When that air cylinder is deenergized (or energized in the opposite direction), it reverses the movement of the crank shaft 47 to lower both bars 38.

Second holder moving means

The second holder moving means is actuated after the leapfrog movement of the first holder has initially proceeded sufficiently to clear the front end of the 2nd holder for forward movement. When actuated, it is operative to move the second quilt-holder forwardly along the working level and completely out of its operative position before the first quilt-holder is lowered into its operative loading position. Preferably it moves the second holder at a forward speed sufficient to carry the second holder into its operative position on the quilting machine Q.

The second holder moving means on the loading table comprises: a second holder conveyor.

*Second holder conveyor.*—The second holder conveyor comprises: a single conveyor assembly located along the longitudinal center of the loading table T to extend from a point adjacent one end thereof to a point adjacent the other end thereof; and a conveyor drive means.

The 2nd holder conveyor assembly comprises: an endless chain 55 centrally disposed underneath the table and extending from one end to the other thereof preferably in vertical alignment with the center slot 12 of the loading table T and adjacent thereto; means rotationally supporting the front end of the chain 55 including a front 2nd conveyor sprocket 56, a short shaft 57 rotationally carrying the front sprocket 56 and brackets 58 supporting the short shaft 57 on the underside of the table near the front end thereof; means rotationally supporting the rear end of the chain 55 including a rear 2nd conveyor sprocket 59 loosely mounted on cross shaft 18 for rotary movement relative thereto; an arm 60 mounted on the 2nd conveyor chain 55 in position to engage and move a 2nd holder forwardly with the 2nd conveyor chain 55.

The drive means for the second holder conveyor assembly drives the rear sprocket 59 thereof. This drive means includes: a drive motor 62 mounted on the bottom of the loading table; a motor-driven chain 63; a chain-driven sprocket 64 loosely mounted on the cross shaft 18; and means connecting the loosely-mounted rear chain-driven sprocket 64 to the loosely mounted rear 2nd conveyor sprocket 59 for rotary movement as a unit.

Transfer control means

The hereinafter given description of the transfer control means begins at the start of an exchange operation when (a) the rear end of the 1st holder is in its ready position at station #1; (b) the coupler 33 of the 1st conveyor is in its starting position at station #1 wherein it is ready to engage the rear end of the 1st holder immediately after the 1st conveyor is actuated; (c) the rear end of the 2nd holder is at station #4; and (b) the arm 60 or "rear end" pusher of the 2nd conveyor is at station #4 wherein it is ready to engage the rear end of the 2nd holder immediately after the 2nd holder is actuated.

It will be appreciated: that the rear end of the 1st holder and said "rear end" coupler 33 will travel rearwardly together leaving one station at the same time and arriving at the next station at the same time; and that the rear end of the 2nd holder and said "rear end" pusher 60 will travel forwardly together in the same fashion.

The transfer control means includes: (1) means for actuating the 1st holder conveyor to move the rear end coupler 33 rearwardly out of station #1 and upwardly to a clearance level; (2) means for actuating the jack means when rear end coupler 33 arrives at station #2; (3) means for actuating the 2nd holder conveyor when said rear end coupler 33 arrives at station #3 to institute the forward movement of the 2nd holder; (4) means for reversing the 1st holder conveyor when said rear end coupler 33 arrives at station #4 so as to disengage the 1st holder from the coupler as the coupler begins its return movement to station #1; (5) means for lowering the jack means (and the front end of the 1st holder) when the loading table is cleared of the 2nd holder; and (6) conveyor shut-down means.

*1st conveyor actuating means—Station #1.*—The means for actuating the 1st holder conveyor to move the rear end coupler 33 from station #1 rearwardly in leapfrog fashion through stations #2 and #3 to station #4, comprises: a normally-open (n/o) 1st conveyor starting relay circuit operative, when closed and thereby energized, to actuate the 1st conveyor; means for closing the 1st conveyor starting relay circuit; and means for holding said circuit closed after said rear end coupler leaves station #1.

The 1st conveyor starting relay circuit extends from line 70 serially through normally closed (n/c) stop button 72, normally-open (n/o) start button 73, n/c limit switch (LS) 74 at station #4, 1st conveyor starting relay coil 75, n/c. reversing relay contacts 91A and n/c safety switches 77 and 78 to line 71.

The means for closing the 1st conveyor starting relay circuit comprises n/o start button 73. When the start button 73 is momentarily closed, it will close the 1st conveyor starting relay circuit and thus energize the starting relay coil 75 which, through controls not shown, starts the motor 19 for the 1st conveyor in a first direction, i.e. the direction required to move the rear end coupler 33 rearwardly out of station #1.

The means for holding the 1st conveyor relay starting circuit closed, comprises n/o relay contacts 75B which are closed by the energization of the 1st conveyor starting relay coil 75. When closed, the relay contacts 75B bypass the momentary start button 73 and thus permit the button 73 to be released without opening the 1st conveyor starting circuit.

With the 1st conveyor starting relay circuit energized, the rear end of the 1st holder will be continuously moved rearwardly from the ready position at station #1 in leapfrog fashion through intermediate stations #2 and #3 to station #4. When the rear end of the 1st holder reaches station #2, the trailing portion of the 1st holder is lifted by actuation of the jack means.

*Jack actuating means—Station #2.*—This means comprises: a n/o solenoid circuit operative, when closed and thereby energized, to actuate the jack means; a n/o solenoid relay circuit operative, when closed, to close the solenoid circuit; means for closing the solenoid relay circuit when said rear end coupler 33 reaches station #2; and a holding circuit for maintaining the solenoid relay circuit closd when said rear end coupler leaves station #2.

The solenoid circuit includes, between lines 70 and 71, a pair of n/o relay contacts 81B and 81C in series with a solenoid coil 80 of the solenoid 50.

The solenoid relay circuit extends from line 70 through a n/o LS 82 at station #2 and a solenoid relay coil 81 to line 71.

The means for closing the solenoid relay circuit preferably comprises a conventional switch-operating device 15A conventionally carried by a chain 15 of the 1st conveyor in position to close the LS 82 momentarily when said rear end coupler reaches station #2.

The (solenoid relay) holding circuit comprises a n/c LS 83 (located between stations #4 and #3 for operation by the 1st conveyor during its return movement) serially connected with n/o relay contacts 81A to form a bypass around the LS 82.

A momentary closure of the LS 82 at station #2 closes the solenoid relay circuit and thus energizes the solenoid relay coil 81 which closes the relay contacts 81A, 81B and 81C simultaneously. The closure of the relay contacts 81B and 81C closes the solenoid circuit and the solenoid coil 80 in it and thus renders the solenoid 50 effective to actuate the jack means upwardly. The simultaneous closure of the relay contacts 81A closes the solenoid relay holding circuit, which functions to bypass the LS 82 in the solenoid relay circuit, and thereby maintains the solenoid relay circuit closed upon the opening of the LS 82 which occurs when said rear end coupler departs from station #2.

The raising of the jack means clears the way for actuating the 2nd conveyor.

*2nd conveyor actuating means—Station #3.*—The means for actuating the 2nd conveyor to move its rear end pusher 60 (see FIGS. 7, 10) from station #4 forwardly through stations #3, #2 and #1 and thereby push the 2nd holder beyond the loading table, comprises: a n/o 2nd conveyor starting circuit operative, when closed and thereby energized, to actuate the 2nd conveyor; a n/o 2nd conveyor delay circuit operative, when closed, to close the 2nd conveyor starting circuit; means for closing the 2nd conveyor relay circuit when the rear end coupler 33 reaches station #3; and a n/o 2nd conveyor holding circuit for maintaining the 2nd conveyor relay circuit closed when said rear end coupler leaves station #3.

The n/o 2nd conveyor starting circuit extends from line 70 to 71 through the stop button 72, parallel 2nd conveyor starting and return branch circuits, n/o relay contacts 87B, a starting coil 85 for the 2nd conveyor, and the overload safety switches 77 and 78. The 2nd conveyor starting branch circuit serially includes relay contacts 75B and 75C; hence, its closure is controlled by starting coil 75 in the above-described 1st conveyor starting circuit. The 2nd conveyor return branch circuit serially includes relay contacts 91B and 91C; hence, its closure is controlled by a 1st conveyor reversing coil 91 in a 1st conveyor return circuit which will be described hereinafter. Before continuing I note: that the relay contacts 75B (in the 2nd conveyor starating branch) are the bypass contacts for the n/o starting switch 73 in the 1st conveyor starting circuit; and that the relay contacts 91B (in the 2nd conveyor return branch) function as bypass contacts for a n/o push button switch 89, which is provided in the means for reversing the 1st conveyor, and as holding contacts for a n/o LS 90 in said 1st conveyor return circuit.

The n/o 2nd conveyor relay circuit (for the 2nd conveyor starting circuit) extends from line 70 serially through a n/o LS 86 (at station #3) and a relay coil 87 to line 71. It functions to start the 2nd conveyor when the 1st conveyor reaches station #3. This function is accomplished by the 1st conveyor's momentary closure of the n/o LS 86 to energize the normally open 2nd conveyor relay circuit and the relay coil 87 in it. The relay coil 87 functions, when thus energized, to close the n/o relay contacts 87B in the 2nd conveyor starting circuit and thereby energize that circuit and the coil 85 in it. The starting coil 85 operates, through controls not shown, to actuate the drive motor 62 for the 2nd conveyor.

The means for closing the 2nd conveyor relay circuit and energizing relay coil 87 preferably comprises a conventional switch-operating device conventionally carried by the 1st conveyor in position to close LS 86 at station #3 momentarily when said rear end coupler 33 reaches station #3. This device may be the switch-operating device 15A or another like device.

The n/o 2nd conveyor holding circuit (for the 2nd conveyor relay circuit) comprises: n/o relay contacts 87A in series with a n/c LS 88 at station #4. The relay contacts 87A close with the energization of the 2nd conveyor relay circuit and the relay coil 87 in it.

Once the 2nd conveyor is actuated, it will make a complete revolution. During the first half of this revolution, its rear end pusher (arm 60) on the endless chain 55 engages the rear end of the 2nd holder and moves it forwardly the full length of the loading table and then shoves it beyond that point sufficiently to clear the loading table for the lowering of both the jack means and the front end of the 1st holder. The forward removal of the 2nd holder from the loading table coincides more or less with the arrival of the rear end coupler at station #4 at which time the rearward movement of the 1st conveyor is stopped by a momentary opening of the 1st conveyor starting relay circuit LS 74 at station #4.

The 1st conveyor may now be reversed.

*First conveyor reversing means—Station #4.*—The means for reversing the 1st holder conveyor when said rear end coupler arrives at station #4 and, through such reversing, disengaging the 1st holder from the coupler as it begins its return movement to station #1, comprises: a n/o 1st conveyor return circuit operative, when activated, to reverse the 1st conveyor and move it to station #1; and means for opening the 1st conveyor starting circuit and contemporaneously closing the 1st conveyor return circuit.

The 1st conveyor return circuit extends from line 70 to line 71 serially through the stop button 72, a n/o LS 90 at station #4, a 1st conveyor reversing relay coil 91, n/c relay contacts 75A, a n/c LS 92 at station #1 and the overload switches 77 and 78.

The inactivating and activating means involved in reversing the 1st conveyor may comprise a switch-operating device, such as 15A, mounted on the 1st conveyor in position to open the LS 74 momentarily and simultaneously close the LS 90 momentarily when the rear end coupler 33 reaches station #4.

A momentary opening of the LS 74 de-energizes the 1st conveyor starting circuit and the relay coil 75 in it. The de-energization of the relay coil 75 stops the 1st conveyor drive motor 19. The de-energization of the relay coil 75 further closes the relay contacts 75A in the 1st conveyor return circuit, opens the relay contacts 75B which bypass the starting button 73 and opens relay contacts 75C which are serially connected with the relay contacts 75B in the starting branch of the 2nd conveyor starting circuit. This would shut down the 2nd conveyor prematurely but for the simultaneous momentary closure of the return branch of the 2nd conveyor starting circuit through a simultaneous momentary closure of the LS 90.

The simultaneous momentary closure of the LS 90 energizes the 1st conveyor return circuit and the 1st conveyor reversing relay coil 91 in it. The energized coil 91, through control means not shown, starts the 1st conveyor drive motor 19 in a reverse direction. The energized coil 91 further immediately opens the reversing relay contacts 91A in the 1st conveyor starting circuit to maintain that circuit de-energized when the 1st conveyor moves its switch-operating device away from the LS 74. At the same time, energized coil 91, closes the relay contacts 91B and 91C in the return branch of the 2nd conveyor starting circuit to maintain the 2nd conveyor in operation. The closed relay contacts 91B also bypass the LS 90 so as to maintain the 1st conveyor return circuit closed when the 1st conveyor moves its switch-operating device, 15A, away from contact with the LS 90.

The elevated front end of the 1st holder is now ready for lowering into its operative position.

*Means for lowering the jack means—Stations #4 and #3.*—The means for lowering the jack means (and the front end of the 1st holder) when the loading table is clear of the 2nd holder, comprises: conveyor-controlled means for opening the solenoid relay holding circuit at some time between the moment when the loading table is cleared and when the operating conveyor returns to its starting position. In this connection, either of the 1st or 2nd conveyors may be employed.

In the arrangement illustrated, the solenoid relay holding circuit serially includes the n/c LS 83, which is located between stations #4 and #3 and the 1st conveyor is provided with means, such as switch-operating means 15A, for momentarily opening the LS 83 when the rear end coupler 33 reaches a corresponding position between stations #4 and #3 on its return movement. The opening of the LS 83 opens the solenoid relay holding circuit, which, in turn, de-energizes the relay coil 81 in the solenoid relay circuit. The de-energization of the relay coil 81 opens the relay contacts 81B and 81C opening the solenoid circuit and de-energizing the solenoid coil 80 of the solenoid 50. The solenoid 50 is thus rendered effective to actuate the jack means downwardly. The jack means thus lowers the 1st holder into its operative position upon the loading table.

The 1st conveyor is now ready to be shut down when its rear end coupler 33 returns to station #1. Likewise, the 2nd conveyor is ready to be shut down when its rear end pusher 60 returns to station #4.

*Conveyor shut-down means—Stations #1 and #4.*—In the illustrated arrangement for shutting down the 1st conveyor, the 1st conveyor return circuit serially includes the n/o now closed LS 92, which is located at station #1. The 1st conveyor is provided with means, such as switch-operating means 15A, for momentarily opening LS 92 and thereby opening the 1st conveyor return circuit to stop the 1st conveyor drive motor 19 when the rear end coupler 33 returns to station #1.

In the illustrated arrangement for shutting down the 2nd conveyor, the holding circuit for the 2nd conveyor holding circuit serially includes a n/c LS 88, which is located at station #4 while the 2nd conveyor is provided with means, such as switch-operating means 55A, for momentarily opening the LS 88 and thereby opening the 2nd conveyor holding circuit to stop the 2nd conveyor drive motor 62 when the rear end pusher 60 returns to station #4.

OPERATION

The foregoing should make the operation of my apparatus abundantly clear; hence, it should suffice to say that when the 1st holder is moved to its ready position, the interchange operation may be automatically effected simply by closing the start button 73. When this is done, the 1st conveyor will begin its rearward run moving its rear end coupler 33 rearwardly upward along the front inclining section of the guide track to engage and move the rear end of the 1st holder first rearwardly upward to the clearance level and thence rearwardly along the clearance level to station #2 and #3 and finally rearwardly downward to the working level at station #4.

However, when the rear end of the 1st holder reaches station #2, the trailing part of the 1st holder will also be raised to the clearance level and moved rearwardly along that level until after the rear end of that holder has been lowered to the working level and the 1st conveyor begins its return movement whereupon the jack means will lower the front end of the 1st holder downwardly to the working level and thus complete the operative positioning of the 1st holder.

In the meantime, when the rear end of the completely elevated 1st holder reaches station #3, the 2nd conveyor will be actuated to move the 2nd holder forwardly and shove it off of the loading table. The 2nd conveyor may (and preferably does) move at a faster speed than the 1st conveyor. At any rate, it moves fast enough to remove the 2nd holder forwardly along and completely beyond the loading table at a time approximating the reversal of the 1st conveyor.

The circuit diagram shows LS 92 located at station #1, LS 82 at station #2, LS 86 at station #3, LS 74, LS 88 and LS 90 all at station #4 and LS 83 at a point between stations #4 and #3, each switch being shown with an arrow indicating the direction of conveyor movement at the time it is operated. This way of locating the limit switches is used to simplify the description of the operation and facilitate an understanding thereof.

But it will, of course, be understood that these limit switches need not be physically located as shown. For example, LS 82 may be located at any selected point along the path of the 1st conveyor so long as it is in position to be operated by the 1st conveyor when the rear end coupler 33 of the 1st conveyor reaches station #2 at which time the jack means at station #1 is to be actuated. Accordingly, when we say that LS 82 is located at station #2, it will be understood that any selected location of LS 82 constitutes its station #2. The same is true of the other conveyor operated limit switches.

Having described my invention, I claim:

1. An improved loading-table interchange transfer means for a quilting apparatus of the type having a quilting machine and a loading table collectively presenting adjacent interchange ends at the rear end of the quilting machine and the front end of the loading table and cooperatively supporting 1st and 2nd quilt holders at ready and operative positions, respectively, comprising:

(A) first holder moving means operative, when actuated, to move the 1st quilt-holder in leapfrog fashion from its ready position rearwardly upward to and along an elevated clearance level over the front end of the 2nd quilt-holder and thence rearwardly downward into said operative position, said means including (1) a first conveyor movable back and forth between the interchange and rear ends of the loading table, (2) guide track means providing a fixed leapfrog path having rearwardly-extending inclining and declining sections respectively adjacent the interchange and rear ends of the loading table and an elevated clearance section therebetween, and (3) a movable coupler normally positioned at the interchange end of the table and connected to both the first conveyor and the guide track means for said rearward movement with the first conveyor and for track-controlled vertical movement relative to the conveyor;

(B) second holder moving means operative, when actuated, to move the 2nd quilt-holder from its operative position horizontally forward toward said quilting machine; and (C) control means for actuating the 1st and 2nd moving means in a time-phase relationship such (1) that the 1st moving means operates to raise the rearwardly moving 1st holder out of the path of the 2nd holder in time to prevent the 2nd holder from moving forwardly into the 1st holder and (2) that the 2nd moving means operates to complete the forward movement of the 2nd holder out of its operative position on the loading table in time to prevent the 1st holder from moving downwardly into the 2nd holder.

2. The interchange transfer means of claim 1 wherein:
   (A) said first conveyor carries said movable coupler back and forth between the interchange and rear ends of the loading table; and
   (B) said guide track means operates, through its inclined, elevated and declined sections, to raise the coupler as the coupler moves rearwardly from the interchange end, hold it at a clearance level as it moves rearwardly between the ends of said table and to lower the coupler as it completes its rearward movement adjacent the rear end of the loading table.

3. The interchange transfer means of claim 2 wherein:
   (A) said coupler is operative, as it moves rearwardly from the interchange end to the rear end of the loading table, to engage the rear end of a 1st quilt-holder in said ready position and, through such engagement, control the leapfrog movement of said engaged rear end in accordance with the inclined, elevated and declined sections of the leapfrog path of the guide means.

4. The interchange transfer means of claim 1 including:
   (A) jack means mounted at the interchange end of the loading table in position to engage the 1st holder slidably and operative, when actuated, to raise the rear end of said 1st quilt-holder to an upper clearance level; and
   (B) means for actuating the jack means after the rear end of the 1st holder has been moved rearwardly and upwardly.

5. The interchange transfer means of claim 4 wherein:
   (A) the control means is operative, when activated, to initiate the operation of said 1st holder conveyor, said jack means and said 2nd holder moving means sequentially in the order named.

6. The interchange transfer means of claim 4 wherein the control means includes:
   (A) means for actuating the 1st holder conveyor to move said coupler rearwardly out of a station #1, which corresponds to the front end of the rearwardly-inclined section of the leapfrog path, and upwardly to a clearance level;
   (B) means for actuating the jack means when said coupler arrives at a station #2, which corresponds to a point in the vicinity of the junction of the rearwardly-extending inclined and clearance sections of said leapfrog path; and
   (C) means for actuating the 2nd holder moving means when said coupler arrives at a station #3 spaced rearwardly from station #2 to institute the forward movement of the 2nd holder.

7. The interchange transfer means of claim 6 wherein the control means includes:
   (A) means for reversing the 1st holder conveyor when said coupler arrives at station #4, which corresponds to the rear end of the rearwardly-extending declined section of said leapfrog path, so as to disengage the 1st holder from the coupler as the coupler begins its return movement to said station #1.

8. The interchange transfer means of claim 7 wherein the control means includes:
   (A) means for lowering the jack means and the front end of the 1st holder when the loading table is cleared of the forwardly moving 2nd holder.

9. The interchange transfer means of claim 8 wherein the control means includes:
   (A) means for deactivating the control means after the 1st holder conveyor is reversed and when said coupler returns to station #1.

10. The interchange transfer means of claim 1 wherein said 2nd holder moving means includes:
    (A) a 2nd conveyor movable, between the rear and interchange ends of the loading table, at a linear speed greater than the linear speed of the 1st conveyor.

11. The interchange transfer means of claim 10 wherein:
    (A) the 1st conveyor moves in an oscillatory manner such that a given point on a given run of that conveyor moves rearwardly and then forwardly between the interchange and the rear ends of the loading table; and
    (B) the 2nd conveyor moves in an endless manner such that a given point moves from the rear end of the loading table forwardly along one run of the 2nd conveyor to the interchange end of the loading table and thence returns along the other run of the 2nd conveyor rearwardly to its original position.

References Cited
UNITED STATES PATENTS

| | | | |
|---|---|---|---|
| 3,044,426 | 7/1962 | Schwarzberger | 112—117 |
| 3,070,049 | 12/1962 | Kalning | 112—117 |
| 3,180,293 | 4/1965 | Cash | 112—118 |

JORDAN FRANKLIN, *Primary Examiner.*

GEORGE V. LARKIN, *Examiner.*